(12) United States Patent
Ichio

(10) Patent No.: US 8,747,129 B2
(45) Date of Patent: Jun. 10, 2014

(54) CHARGING CONNECTOR AND METHOD OF MOUNTING IT

(75) Inventor: Toshifumi Ichio, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 58 days.

(21) Appl. No.: 13/356,082

(22) Filed: Jan. 23, 2012

(65) Prior Publication Data

US 2012/0202365 A1 Aug. 9, 2012

(30) Foreign Application Priority Data

Feb. 4, 2011 (JP) ................................. 2011-023129

(51) Int. Cl.
*H01R 13/447* (2006.01)

(52) U.S. Cl.
USPC ............................................ 439/135; 439/34

(58) Field of Classification Search
USPC .......................................... 439/135, 136, 148
IPC .............. H01R 13/5213,13/447; B60L 11/1818
See application file for complete search history.

(56) References Cited

U.S. PATENT DOCUMENTS

| | | | | |
|---|---|---|---|---|
| 4,981,439 A | * | 1/1991 | Piedmont | 439/135 |
| 5,308,253 A | * | 5/1994 | Maki | 439/148 |
| 5,630,419 A | * | 5/1997 | Ranalletta | 600/459 |
| 5,820,395 A | * | 10/1998 | Hashizawa | 439/271 |
| 6,183,274 B1 | | 2/2001 | Allum | |
| 7,789,679 B2 | * | 9/2010 | Wu et al. | 439/135 |
| 7,914,306 B1 | * | 3/2011 | Blackwell | 439/135 |

FOREIGN PATENT DOCUMENTS

| | | |
|---|---|---|
| EP | 0715373 | 6/1996 |
| JP | 6-290831 | 10/1994 |
| WO | 2010060370 | 6/2010 |

* cited by examiner

*Primary Examiner* — Hien Vu

(74) *Attorney, Agent, or Firm* — Gerald E. Hespos; Michael J. Porco; Matthew T. Hespos

(57) ABSTRACT

A charging connector (10) is provided for connection to a vehicle-side connector provided in a vehicle to charge a battery installed in the vehicle. The charging connector (10) includes a main body (11) with a connecting portion (13) connectable to the vehicle-side connector, a protection cap (30) made of an insulating material and to be mounted on the connecting portion (13) when the connecting portion (13) is separated from the vehicle-side connector, and a cable (W) drawn out from the main body (11) for connection to a power supply. The protection cap (30) is removed from the connecting portion (13) and attached to the cable (W) when connecting the connecting portion (13) to the vehicle-side connector.

15 Claims, 30 Drawing Sheets

CHARGING CONNECTOR AND METHOD OF MOUNTING IT

BACKGROUND OF THE INVENTION

1. Field of the Invention

The invention relates to a charging connector that is connected to a vehicle-side connector in a vehicle to charge a battery in the vehicle, and to a method of mounting or connecting the charging connector.

2. Description of the Related Art

Japanese Unexamined Patent Publication No. H06-290831 discloses a charging connector with a connector connecting portion that is connectable to a vehicle-side connector. The connector connecting portion is provided in a front end portion of a case body, and a cable connected to a power supply is drawn out from a lower part at the rear end of the case body. Terminal fittings, such as power supply terminals, are provided in the connector connecting portion for supplying power from the power supply to the vehicle-side connector. These terminal fittings are arranged to be located at the front side of the case body and are connectable to vehicle-side terminals in the vehicle-side connector. The case body also includes a protection cap to be mounted on the connector connecting portion.

The above-described protection cap is attached to a grip of the case body via a belt, and a hook for catching the belt is provided on the grip. However, a part of the grip where the hook is provided cannot be held. Hence, the grip must have a part to be held in addition to the part where the hook is provided. This makes the grip larger, causing poor appearance and, in addition, enlarges the charging connector.

The invention was completed in view of the above situation and an object thereof is to enable mounting of a protection cap without enlarging a charging connector.

SUMMARY OF THE INVENTION

The invention relates to a charging connector for connection to a vehicle-side connector in a vehicle to provide current for charging a battery in the vehicle. The connector has a case body with a connecting portion that is connectable to the vehicle-side connector. The connector also has a protection cap made of an insulating material and mountable on the connecting portion separated from the vehicle-side connector. A cable drawn out from the interior of the case body can be connected to a power supply. The protection cap is to be removed from the connecting portion and attached to the cable when connecting the connecting portion to the vehicle-side connector.

The protection cap that is removed from the connecting portion can be attached to the cable. Thus, the case body does not need an attaching portion to attach the protection cap and enlarge the charging connector. Further, the protection cap can be attached to the cable. Thus, damaging contact of the protection cap with the vehicle body can be prevented.

The protection cap may include a facing wall substantially facing the connecting portion in a mounting direction to cover the connecting portion. A peripheral wall may extend from the facing wall in the mounting direction substantially along the outer surface of the connecting portion.

An end edge of the peripheral wall may be cut off to form at least one mounting groove. The mounting groove may be formed to surround the cable over more than about half the circumference. Thus, the protection cap can be attached to the cable by being held in the mounting groove.

The connecting portion may include a power supply terminal for supplying power and at least one separation wall extending from a facing surface of the facing wall substantially in the mounting direction to separate the power supply terminal from another terminal.

The peripheral wall may be formed with two mounting grooves that substantially facing each other. The separation wall extends substantially along the cable mounted between the mounting grooves. Thus, the protection cap can be attached more strongly to the cable since the cable can also be engaged with the separation wall as well as the mounting grooves. The separation wall preferably reinforces parts of the mounting grooves in the protection cap. Parts of the protection cap between peripheral edges of the mounting grooves and the facing wall may be resiliently deformed to widen opening parts of the mounting grooves.

The charging connector may further comprise a lock for locking the vehicle-side connector and the connecting portion in a connected state.

The protection cap may integrally or unitarily include a protecting portion for protecting the lock.

The protecting portion may be a hook to be hooked onto the cable.

A distance between a leading end of a catch and a projecting end of a locking projection may be smaller than the diameter of the cable.

A dimension of a first side of the peripheral wall along the mounting direction may be smaller than a dimension of a second side thereof in forward and backward directions, Two of the terminal fittings may be power supply terminals and the cap may comprise an intermediate wall to be inserted between the power supply terminal fittings. The protection cap may be positioned in a rotating direction along the peripheral wall by inserting the intermediate wall between the two power supply terminal fittings.

The invention also relates to a method of mounting or connecting a charging connector to a vehicle-side connector in a vehicle to provide current particularly for charging a battery installed in the vehicle. The method comprises mounting a protection cap made of an insulating material on a connecting portion of a case body when separated from the vehicle-side connector; and before or when connecting the connecting portion to the vehicle-side connector, removing the protection cap from the connecting portion and attaching the protection cap to a cable drawn out from the interior of the case body to be connected to a power supply. Thus, it is possible to enable mounting of a protection cap without enlarging a charging connector.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
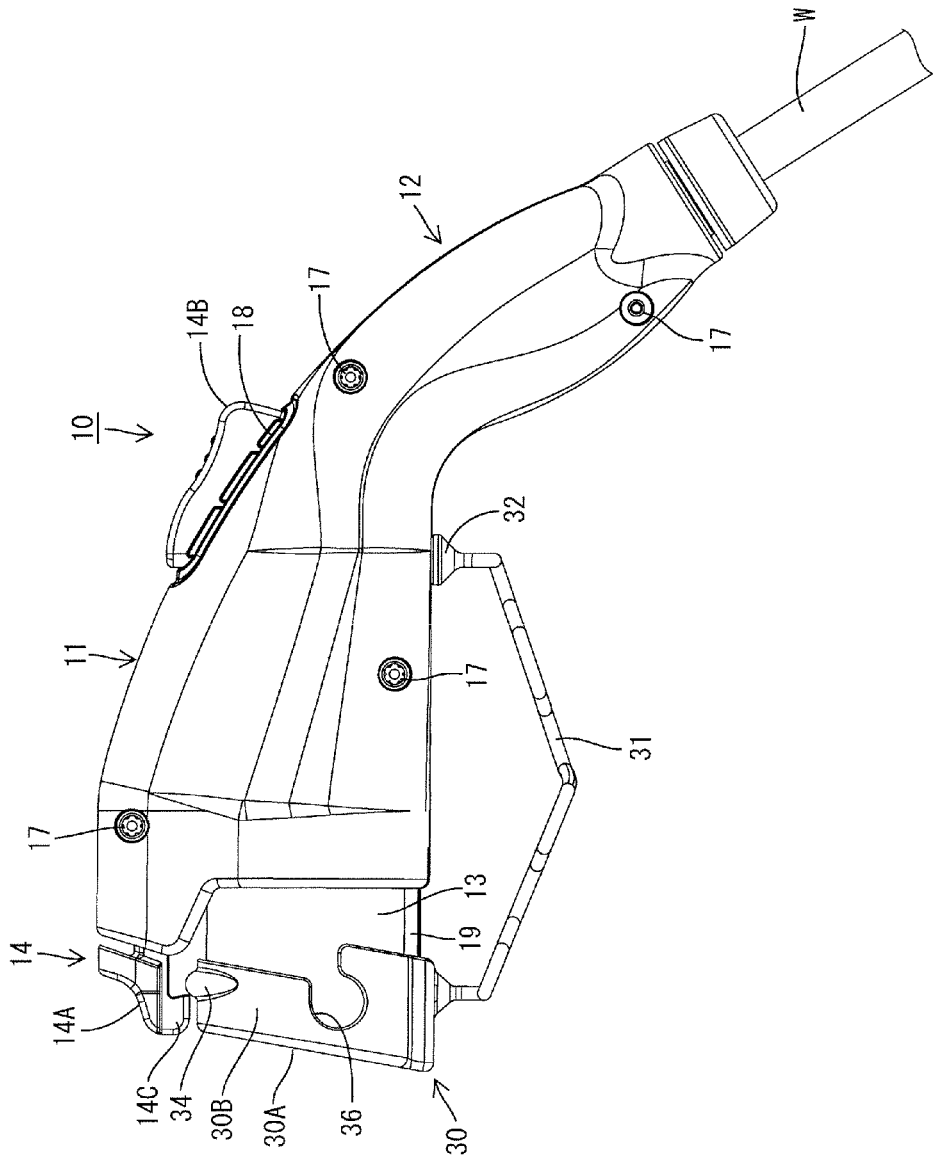
FIG. 1 is a side view showing a state where a protection cap is mounted on a connecting portion in a first embodiment.

A first embodiment of the invention is described with reference to FIGS. 1 to 14. As shown in FIG. 1, a charging connector 10 in this embodiment is substantially pistol-shaped and includes a main body 11 at a front part of the charging connector 10 and a grip 12 extending obliquely down from a rear end of the connector main body 11. The main body 11 and the grip 12 are molded of synthetic resin, and are assembled by uniting two half case bodies and fixing the half case bodies by bolts 17 to define a case body.

A substantially tubular connecting portion 13 projects forward at a front end portion of the main body 11. A lever 14 is housed in an upper part of the interior of the main body 11. A lock 14A is provided at a front end of the lever 14 and an unlocking portion 14B is at the rear end of the lever 14. The lock 14A projects forward from the main body 11 to be located outside and a claw 14C projects substantially orthogonally down from the lock 14A. The unlocking portion 14B projects outside of the connector main body 11 through an insertion hole 18 in the rear of the upper surface of the main body 11.

Figure 3:
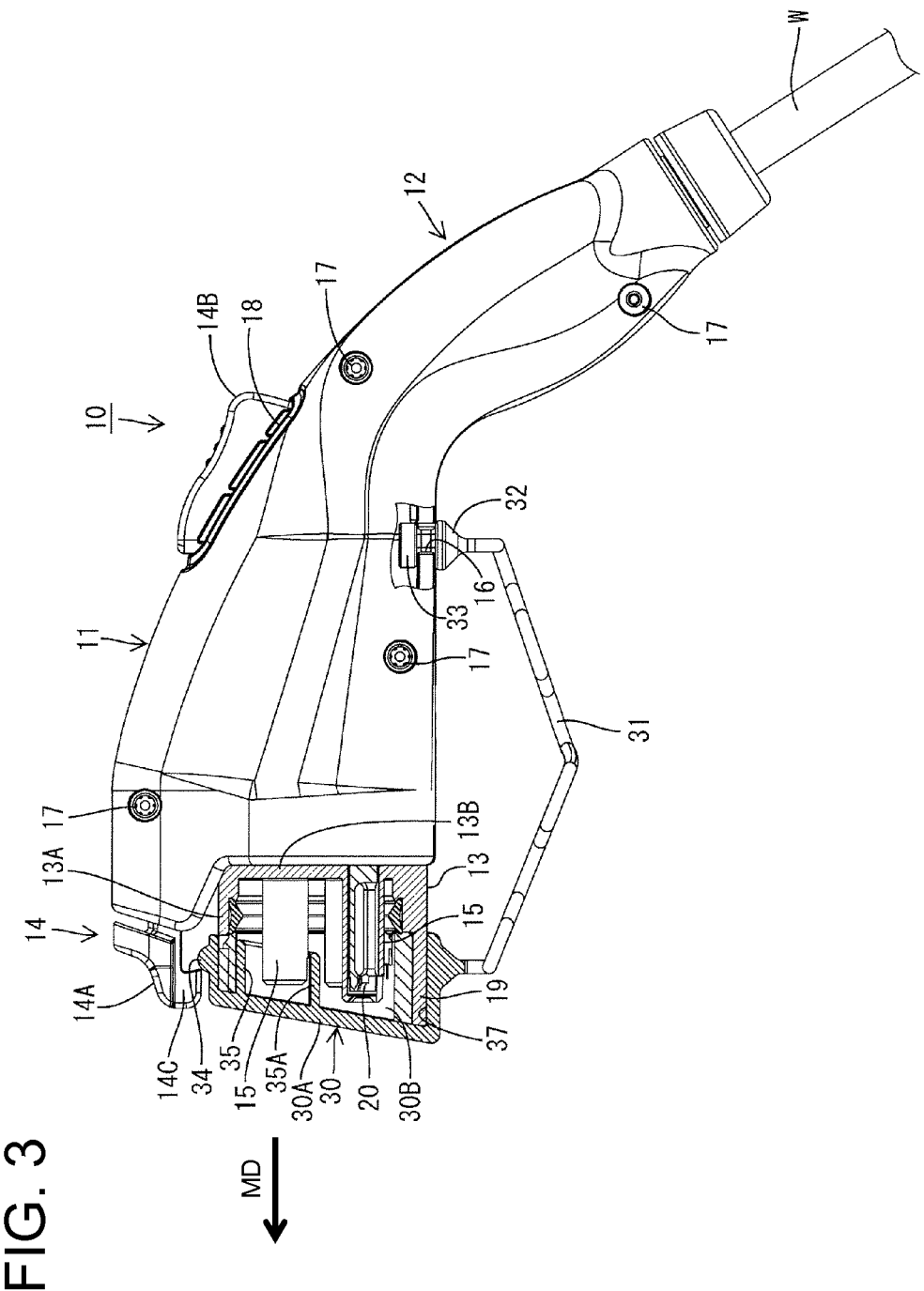
FIG. 3 is a side view showing the internal structures of the protection cap and the connecting portion in FIG. 1.

The connecting portion 13 is formed separate from the main body 11 and is fixed to the main body 11 by an unillustrated locking means. The connecting portion 13 includes a forwardly open receptacle 13A and substantially cylindrical terminal accommodating portions 15 project forward from a back wall 13B of the receptacle 13A, as shown in FIG. 3. The receptacle 13A covers substantially the entire periphery of the terminal accommodating portions 15. Cavities for accommodating terminal fittings 20 are formed in the terminal accommodating portions 15.

Terminal fittings 20 are provided in upper and lower rows. The terminal fitting 20 in the upper row is a power supply terminal for supplying power and the terminal fitting 20 in the lower row is a signal terminal for transmitting and receiving electrical signals. A cable W is drawn out from an end portion of the grip 12. One end of the cable W is connected to a power supply and the other end is connected to the terminal fitting 20 in the upper row. In this way, the charging connector 10 can be connected to a vehicle-side connector (not shown) in a vehicle, and the terminal fitting 20 in the upper row is to be connected to a vehicle-side terminal fitting (not shown) in the vehicle-side connector to provide current to circuits provided therein e.g. to charge a battery (not shown) installed in the vehicle.

A protection cap 30 made of an insulating material is mounted to the connecting portion 13 and electrically insulates the terminal fittings 20 from the outside. The protection cap 30 preferably is made of a flexible elastomer having a rubber hardness of more than about 30, more preferably about 40. A rubber, resilient or flexible string 31 is molded integrally or unitarily to the protection cap 30 and connects the protection cap 30 to the main body 11. Thus, the protection cap 30 and the main body 11 can be handled as an integral assembly and the protection cap 30 cannot be separated from the main body 11.

A holder 32 is formed on an end of the rubber string 31 for holding the end portion of the rubber string 31 on the main body 11. More particularly, the holder 32 includes a flat plate-shaped retainer 33 that is larger than the diameter of a water drain hole 16 that penetrates through a rear part of the lower surface of the main body 11. The holder 32 is fit to the water drain hole 16 with the retainer 33 accommodated in the main body 11, as shown in FIG. 3. The holder 32 is held and retained by assembling the main body 11 with the retainer 33 fit in the water drain hole 16 in advance in this embodiment. However, the retainer may be formed to have a tapered shape so as to be insertable into the water drain hole 16 after the main body 11 is assembled.

Figure 4:
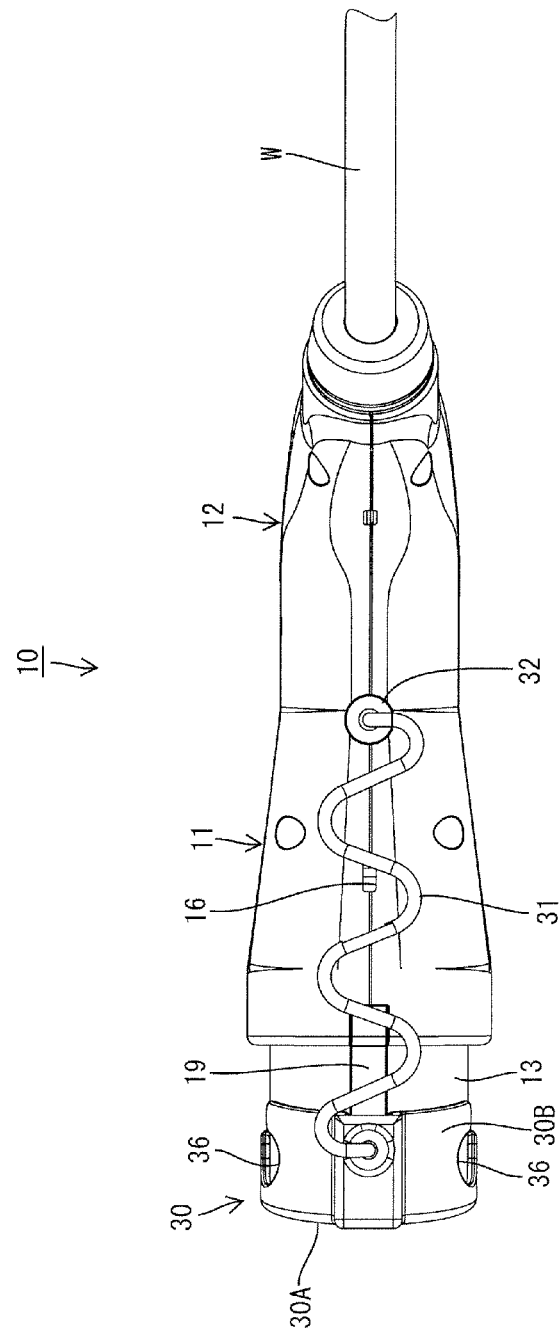
FIG. 4 is a bottom view showing the state where the protection cap is mounted on the connecting portion.
Figure 6:
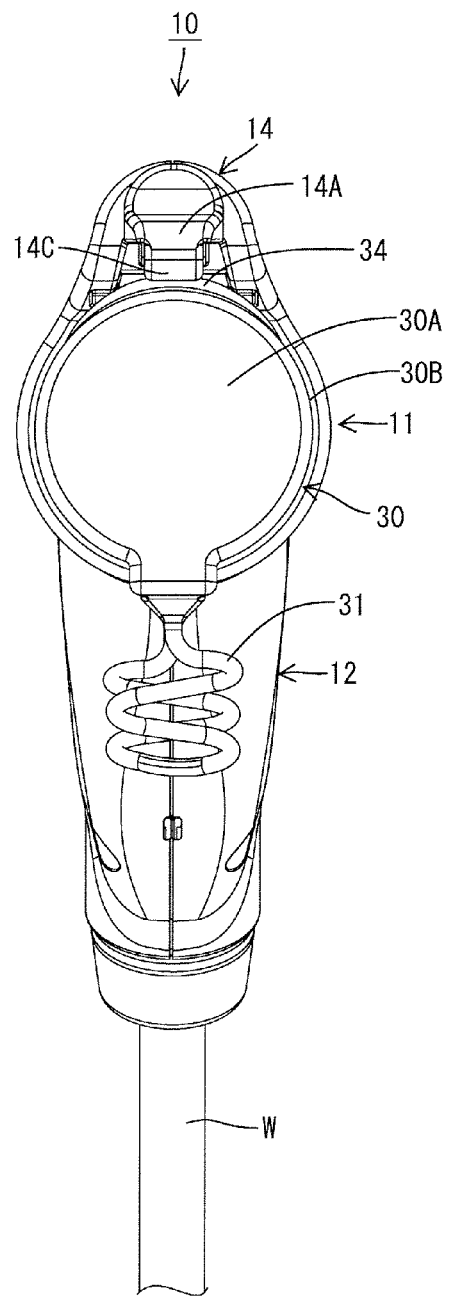
FIG. 6 is a front view showing the state where the protection cap is mounted on the connecting portion.

As shown in FIG. 4 or 6, the rubber string 31 substantially is wavy or spiral-shaped with the protection cap 30 mounted on the connecting portion 13. As a result, as shown in FIG. 1, the rubber string 31 will not hang down significantly from the main body 11 and will remain near the connector main body 11 to prevent the charging connector 10 from being lifted by mistakenly holding the rubber string 31 in starting a charging operation.

Figure 2:
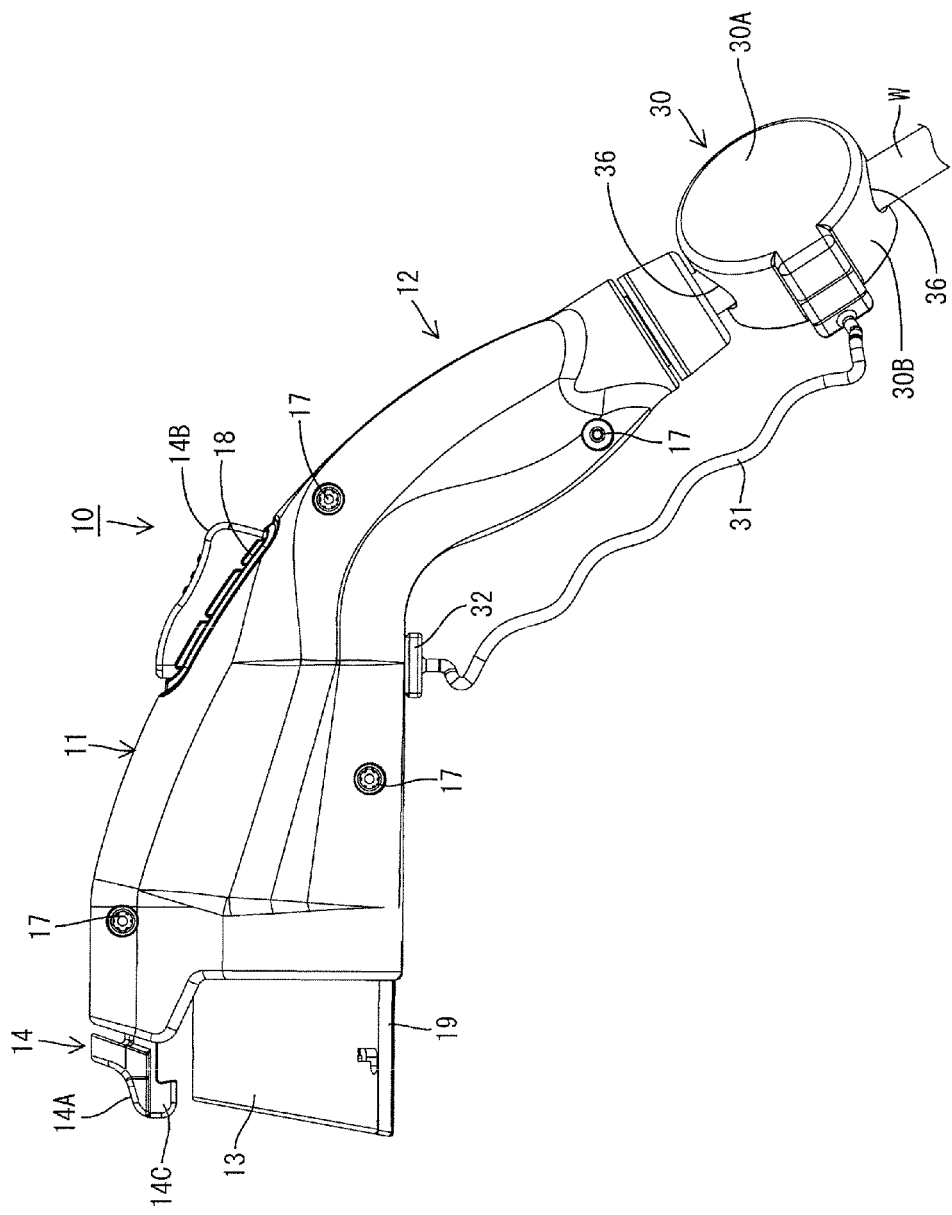
FIG. 2 is a side view showing a state where the protection cap is attached to a cable.
Figure 5:
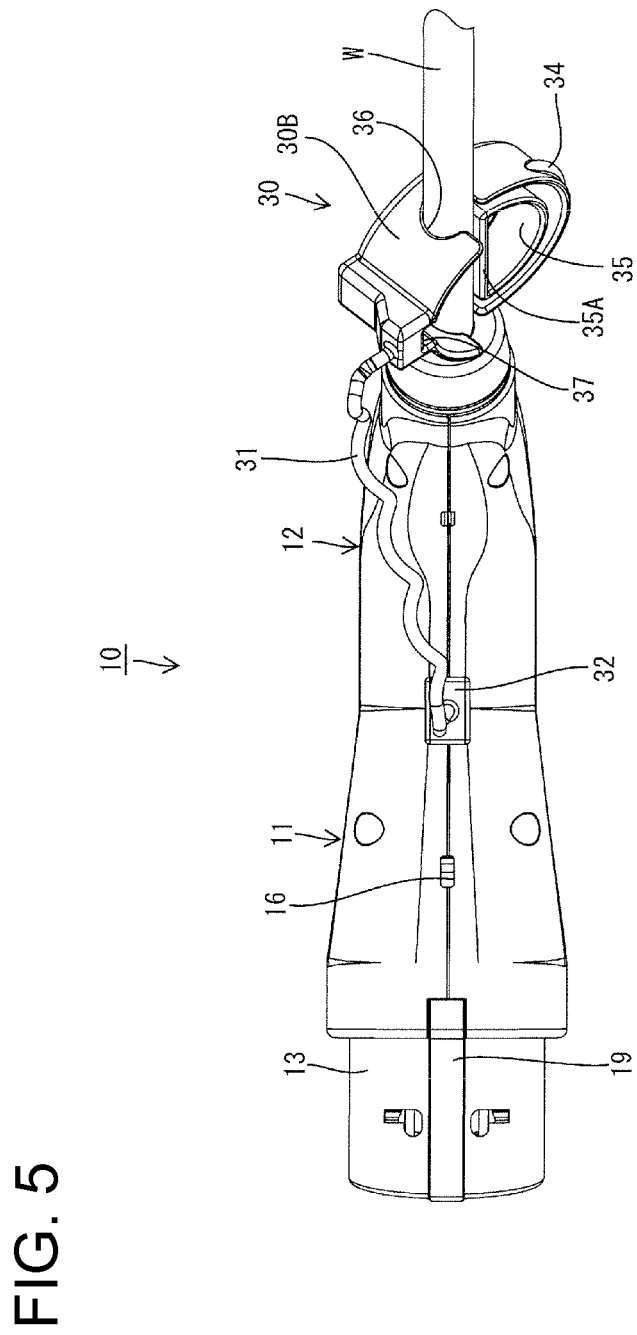
FIG. 5 is a bottom view showing the state where the protection cap is attached to the cable.

The protection cap 30 is removed to expose the connecting portion 13 to the outside prior to starting the charging operation. The removed protection cap 30 could contact and damage a vehicle body if left to hang down. Thus, the removed protection cap 30 of this embodiment is to be attached to the cable W of the charging connector 10, as shown in FIG. 2 or 5, so that the protection cap 30 cannot contact the vehicle body. Note that the rubber string 31 is stretched near the grip 12 when the protection cap 30 is attached to the cable W.

Figure 9:
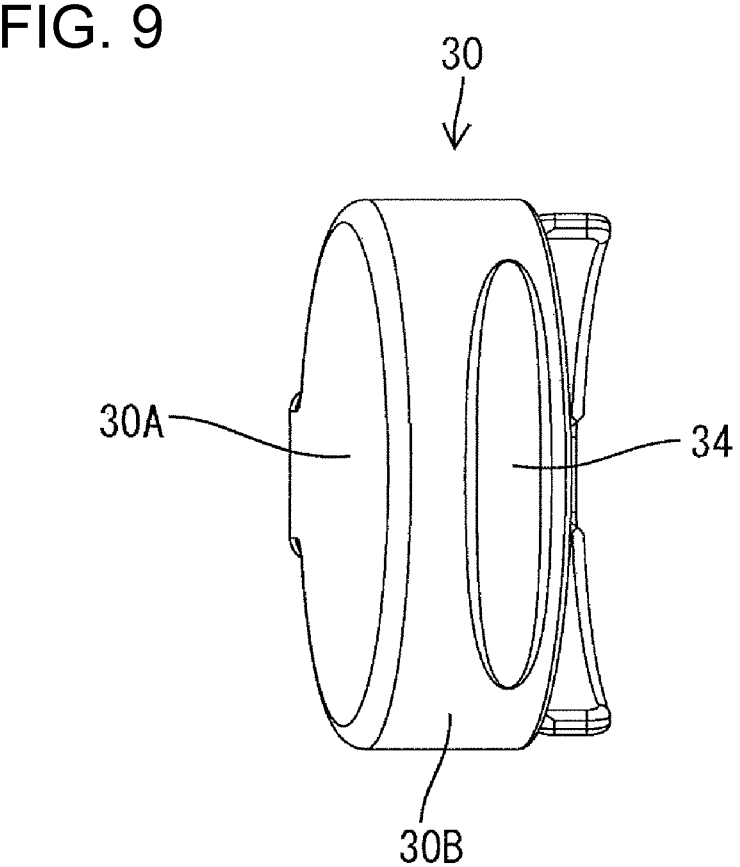
FIG. 9 is a plan view of the protection cap.
Figure 10:
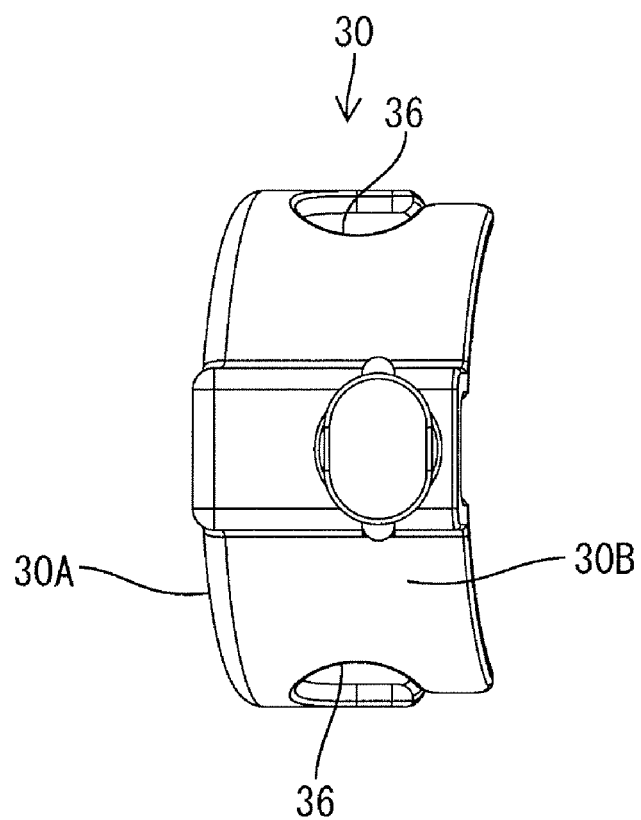
FIG. 10 is a bottom view of the protection cap.

The protection cap 30 includes a substantially tubular facing wall 30A and a peripheral wall 30B extending from the peripheral edge of the facing wall 30A, as shown in FIGS. 9 to 14. The facing wall 30A is inclined somewhat with respect to a mounting direction MD of the protection cap 30 on the connecting portion 13, as shown in FIG. 3. Accordingly, the upper side of the peripheral wall 30B is shorter than the lower side thereof in the forward and backward mounting direction MD. Further, a locking projection 34 projects up from the upper surface of the peripheral wall 30B and engages the claw 14C of the lock 14A from behind for holding the protection cap 30 on the connecting portion 13. The locking projection 34 has a substantially elliptical shape that is long in a circumferential direction of the peripheral wall 30B, as shown in FIG. 9.

Figure 13:
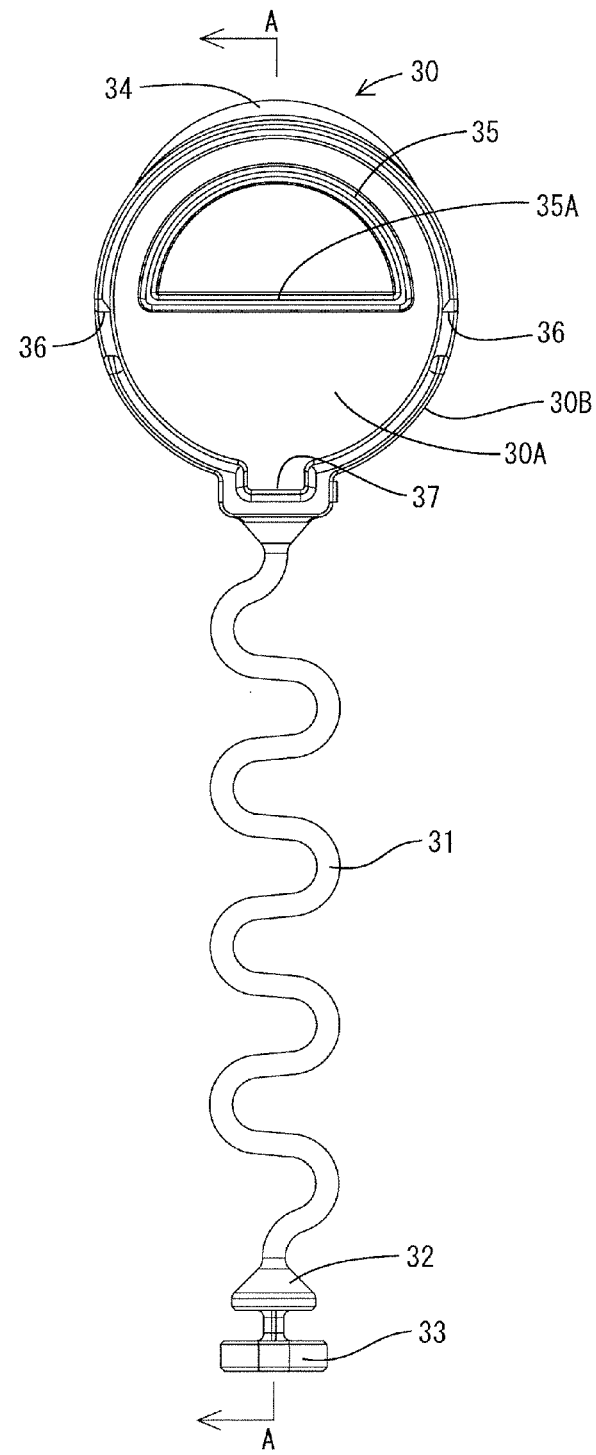
FIG. 13 is a rear view of the protection cap.
Figure 14:
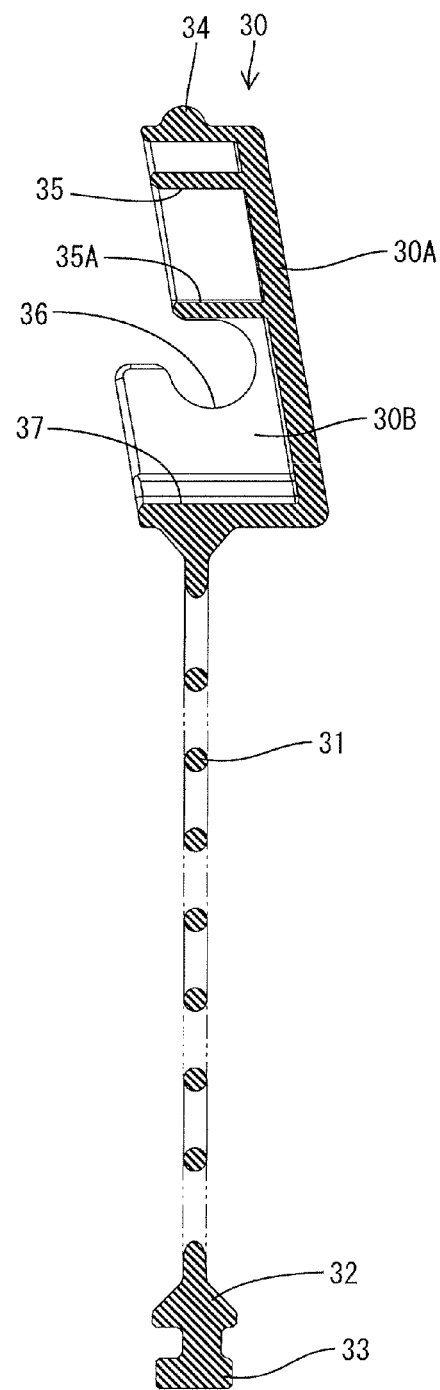
FIG. 14 is a section along A-A of FIG. 13.

The facing wall 30A faces toward the connecting portion 13 in the forward and backward mounting direction MD to close a front opening of the receptacle 13A, as shown in FIG. 3, and the leading end of the receptacle 13A substantially contacts a facing surface of the facing wall 30A that faces the connecting portion 13. On the other hand, the peripheral wall 30B extends back along the outer circumferential surface of the receptacle 13A of the connecting portion 13. A substantially semi-cylindrical separation wall 35 extends back from the facing surface of the facing wall 30A, as shown in FIG. 13. The separation wall 35 covers the entire periphery of the terminal fitting 20 in the upper row, as shown in FIG. 3. A substantially planar part 35A of the separation wall 35 is inserted between the terminal fittings 20 in the upper and lower rows for electrically insulating the upper and lower terminal fittings from one another. Note that the height of the planar part 35A is so set that the upper and lower terminal fittings 20 are electrically insulated and the planar part 35A can be engaged with the cable W.

A positioning groove 37 is formed in the protection cap 30 and extends in the forward and backward mounting direction MD, as shown in FIG. 13. The positioning groove 37 is recessed down from a bottom part of the peripheral wall 30B and can receive a positioning rib 19 that projects from a bottom part of the receptacle 13A of the connecting portion 13. The protection cap 30 can be positioned circumferentially on to the connecting portion 13 by engaging the positioning rib 19 with the positioning groove 37.

Figure 11:
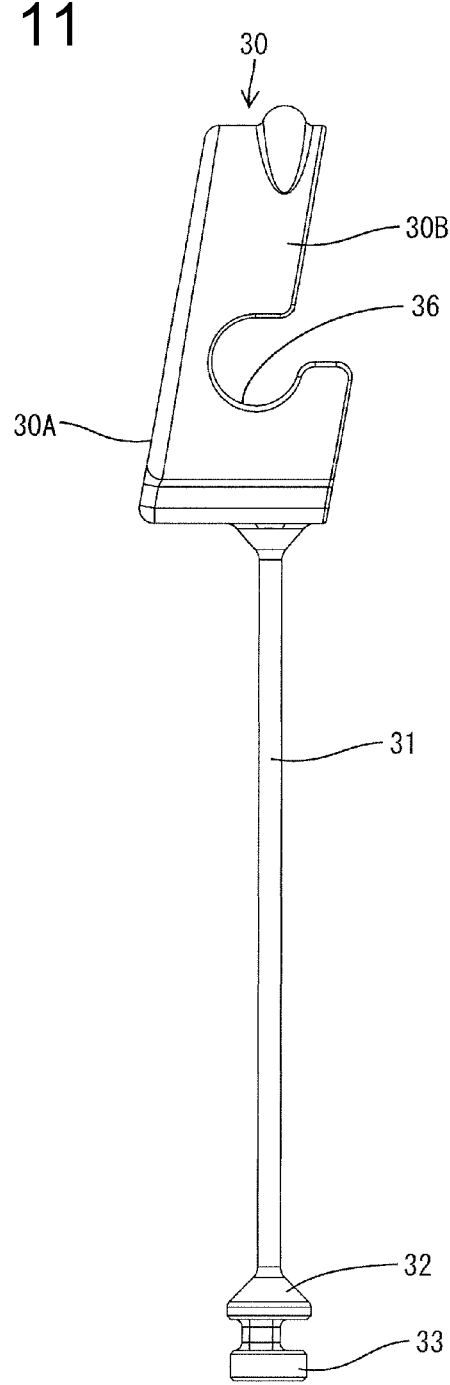
FIG. 11 is a side view of the protection cap.
Figure 12:
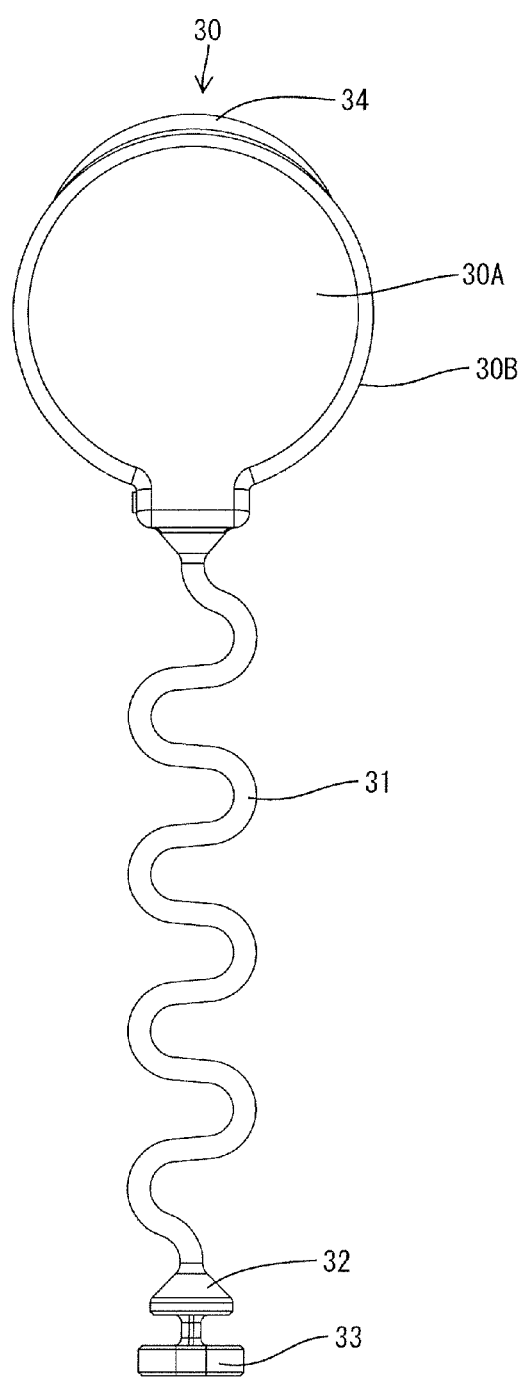
FIG. 12 is a front view of the protection cap.

Two arcuate mounting grooves 36 are formed in the opposite side surfaces of the peripheral wall 30B and extend from an end edge of the peripheral wall 30B toward the facing wall 30A, as shown in FIG. 11. Parts of the peripheral wall 30B below the mounting grooves 36 project more back than parts of the peripheral wall 30B above the mounting grooves 36. Each mounting groove 36 can surround the cable W over more than half the circumference, and preferably about ¾ of the circumference in this embodiment. Thus, the protection cap 30 can be attached and hooked onto the cable W by engaging more than half of the circumference of the cable W in the mounting grooves 36, as shown in FIG. 5. Further, the planar part 35A of the separation wall 35 is arranged substantially along the cable W extending between the both mounting grooves 36, and the protection cap 30 can be hooked onto the cable W by tight holding of the cable W by the mounting grooves 36 and the contact of the cable W with the planar part 35A of the separation wall 35. Therefore, the protection cap 30 is attached strongly to the cable W.

Figure 7:
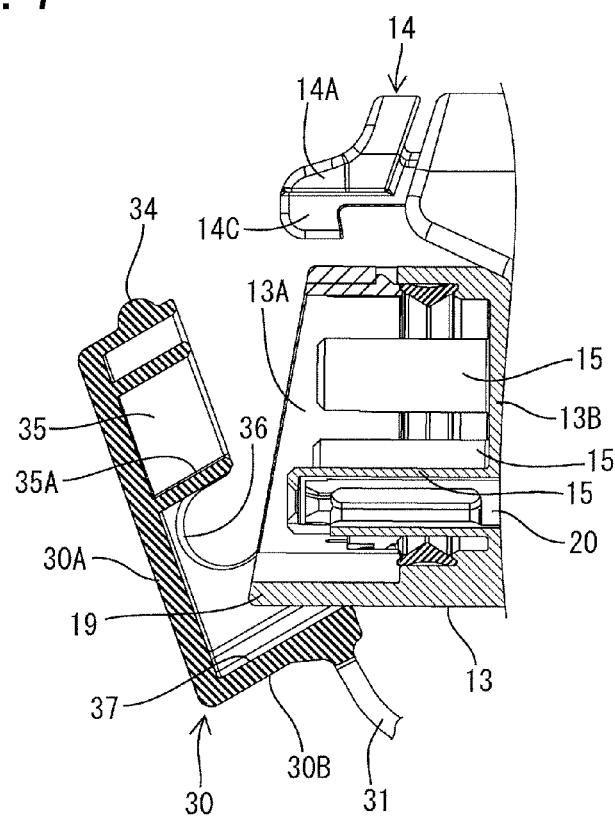
FIG. 7 is a section showing a state of mounting the protection cap on the connecting portion.
Figure 8:
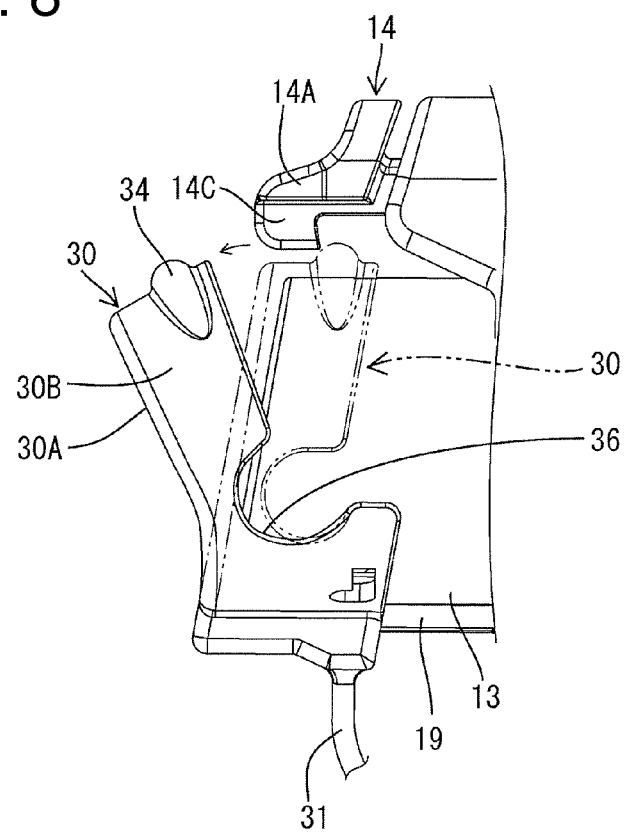
FIG. 8 is a side view showing a state of removing the protection cap from the connecting portion.

The protection cap 30 is mounted on the connecting portion 13, by placing the lower part of the peripheral wall 30B of the protection cap 30 on the lower side of the receptacle 13A of the connecting portion 13, as shown in FIG. 7. A dimension of the upper part of the peripheral wall 30B in the forward and backward mounting direction MD is smaller than a dimension of the lower part thereof in forward and backward directions. Thus, the upper part of the peripheral wall 30B is less likely to interfere with the claw 14C so that the protection cap 30 can be mounted easily on the connecting portion 13 merely by rotating the protection cap up while keeping the lower part of the connecting portion 13 in contact with the lower part of the peripheral wall 30B. On the other hand, the part of the protection cap 30 above the mounting grooves 36 can be pulled apart from the connecting portion 13 to perform a removing operation, as shown in FIG. 8. Parts of the protection cap 30 between the peripheral edges of the mounting grooves 36 and the facing wall 30A are deformed resiliently to widen the mounting grooves 36 during the removal operation.

As described above, the mounting grooves 36 of the protection cap 30 can be fit on the cable W to attach the protection cap 30 to the cable W. Accordingly, the main body 11 and the grip 12 do not require an attaching portion to attach the protection cap 30 and enlarge the charging connector 10. Further, the attachment of protection cap 30 to the cable W after the protection cap 30 is removed from the connecting portion 13 prevents the protection cap 30 from contacting and damaging the vehicle body.

The protection cap 30 can be hooked onto the cable W by the contact of the cable W along the planar part 35A of the separation wall 35. Thus, attachment strength to the cable W is stronger than if the cable W is received and held only by the mounting grooves 36. Furthermore, the separation wall 35 reinforces the upper parts of the mounting grooves 36 in the protection cap 30. Thus, only the facing wall 30A adjacent to the mounting grooves 36 can be bent while the mounting grooves 36 are widened without resiliently deforming the upper parts.

The planar part 35A of the separation wall 35 that separates the power supply terminal fitting 20 in the upper row from the signal terminal fitting 20 in the lower row is arranged along the cable W, and the protection cap 30 is supported by bringing this planar part 35A into contact with the cable W.

A second embodiment of the invention is described with reference to FIGS. 15 to 21. This embodiment is achieved by partly changing the construction of the protection cap 30 in the first embodiment while other constructions are the same or similar. Elements that are the same as or similar to the first embodiment are identified by the same reference numerals, but are not described again. Further, parts of the protection cap that are the same as or similar to the protection cap 30 of the first embodiment are identified by reference numerals where the tens digit is changed from 3 to 4.

Figure 18:
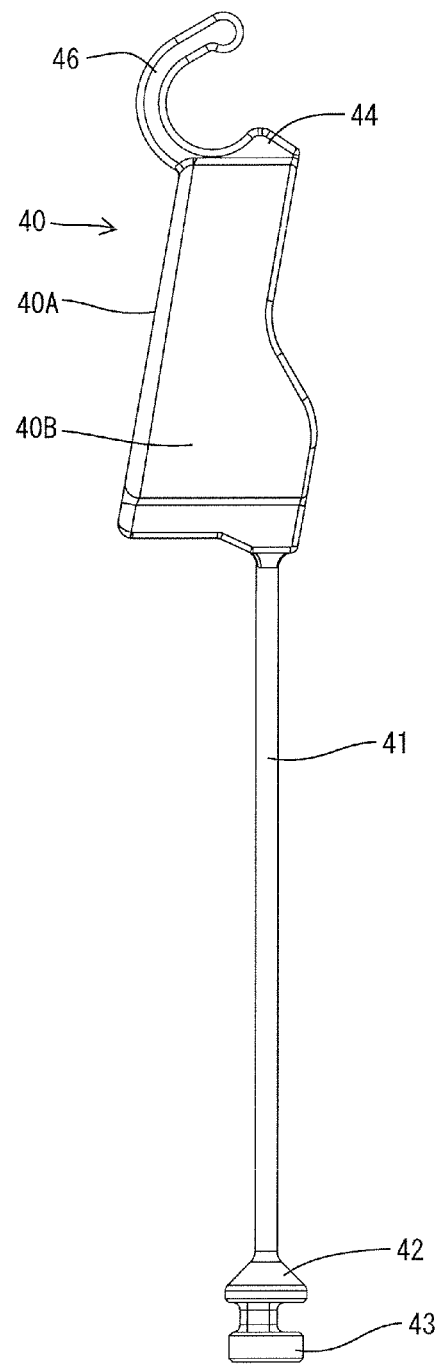
FIG. 18 is a side view of the protection cap.
Figure 19:
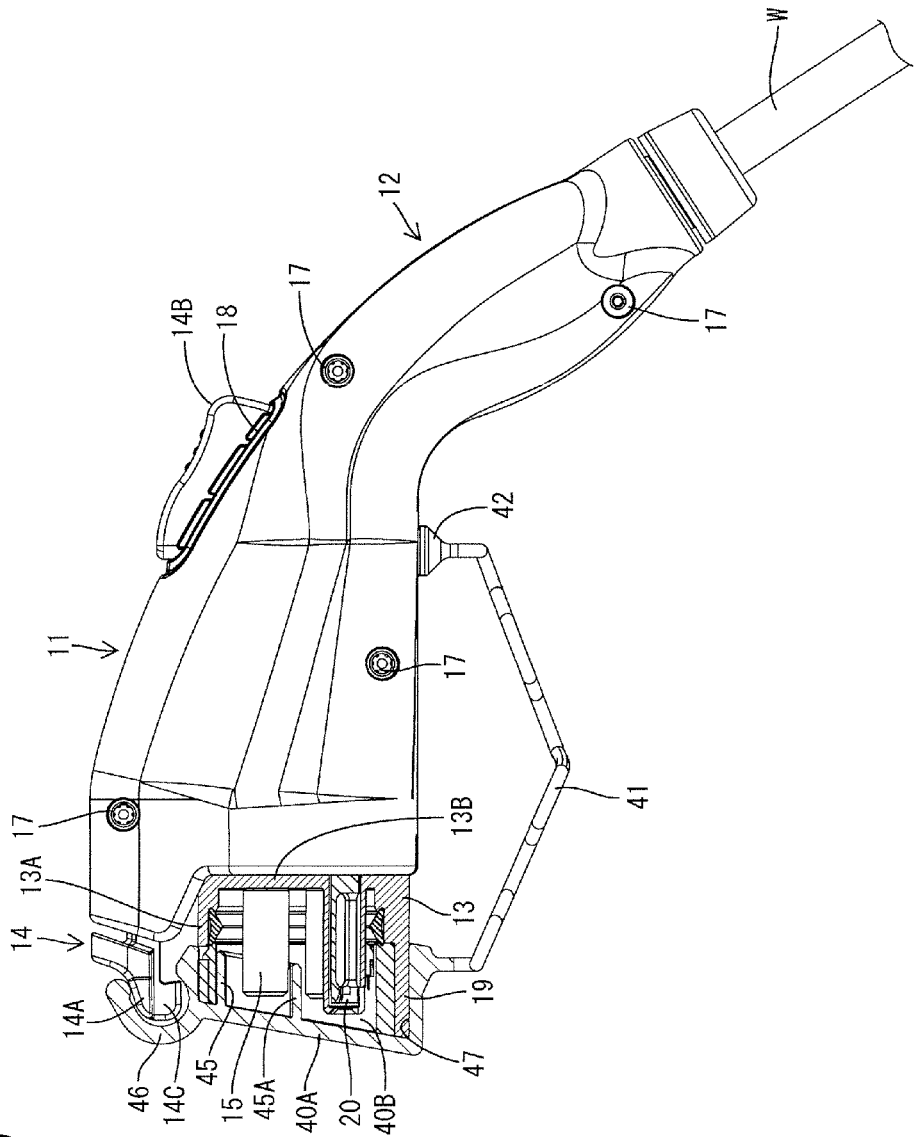
FIG. 19 is a section corresponding to FIG. 3 in the second embodiment.
Figure 20:
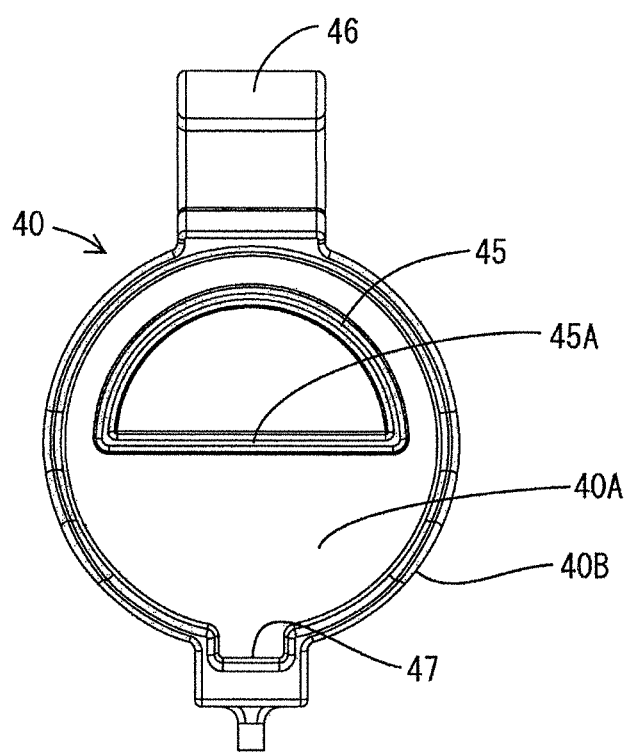
FIG. 20 is a rear view of the protection cap.
Figure 21:
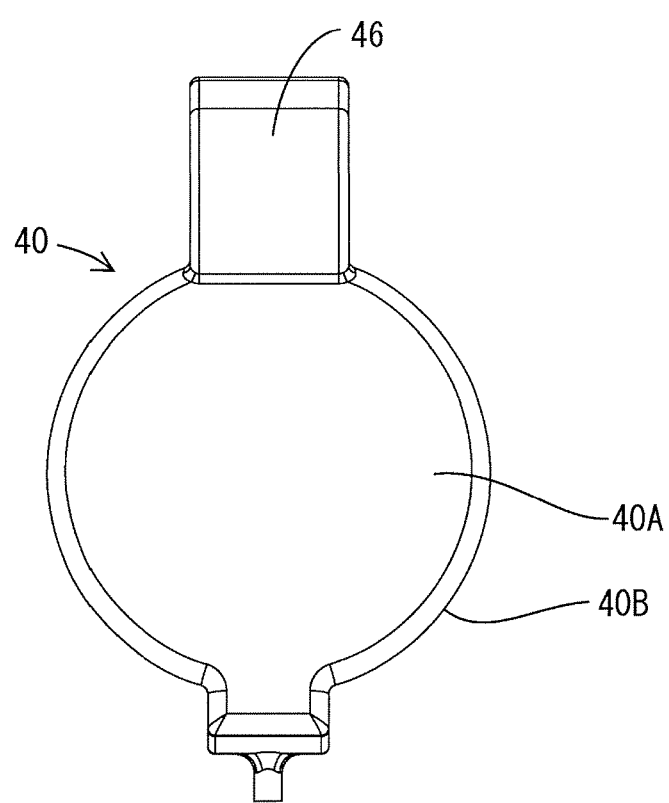
FIG. 21 is a front view of the protection cap.

The protection cap 40 of this embodiment has no mounting grooves 36 in a peripheral wall 40B and instead a hook-shaped catch 46 projects from the upper edge of a facing wall 40A, as shown in FIG. 18. This catch 46 has an arcuate or bent shape and is folded back from the upper edge of the facing wall 40A. Thus, when the protection cap 40 is mounted on the connecting portion 13, the catch 46 covers the claw 14C of the lock 14A, as shown in FIG. 19, to protect the lock 14A from the outside.

Figure 15:
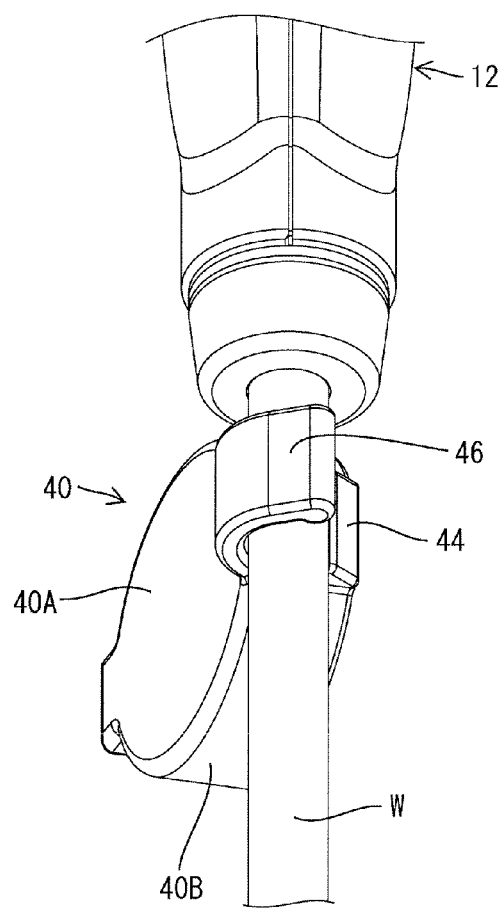
FIG. 15 is a rear view showing a state where a protection cap is mounted on a connecting portion in a second embodiment.
Figure 16:
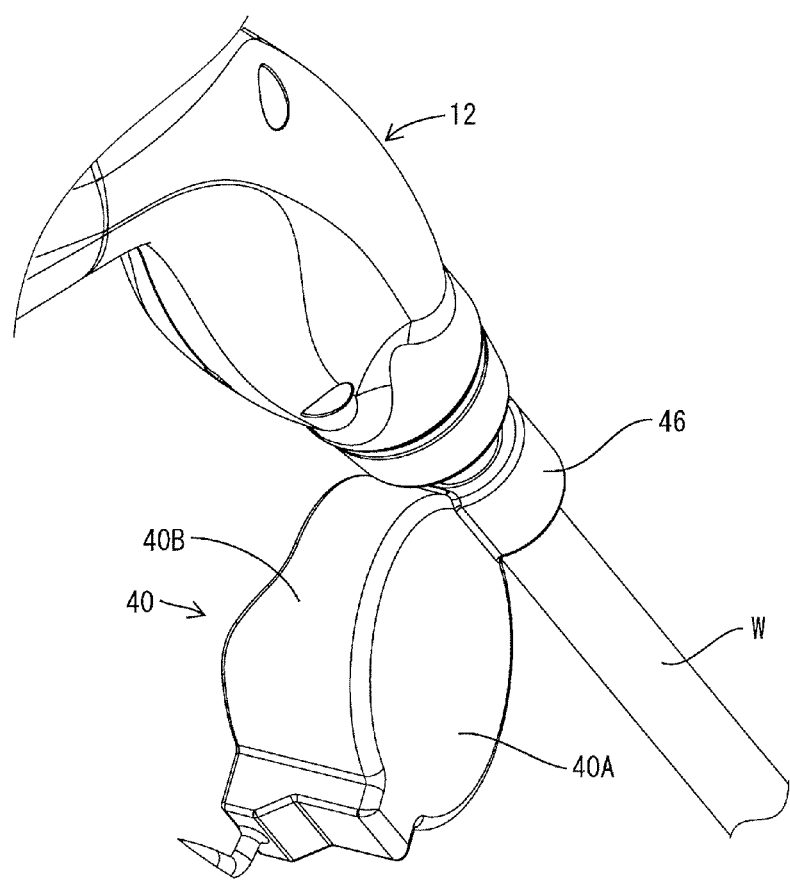
FIG. 16 is a perspective view showing the state where the protection cap is mounted on the connecting portion when obliquely viewed from front.

The protection cap 40 is fixed to the cable W with the catch 46 being wound around the cable W, as shown in FIG. 15. That is, the catch 46 surrounds the cable W over more than about half the circumference and the leading end of the catch 46 projects radially in and is somewhat thicker. Further, a distance between the leading end of the catch 46 and the projecting end of a locking projection 44 is smaller than the diameter of the cable W. Thus, the catch 46 is snapped onto the cable W to attach the protection cap 40 to the cable W.

Figure 17:
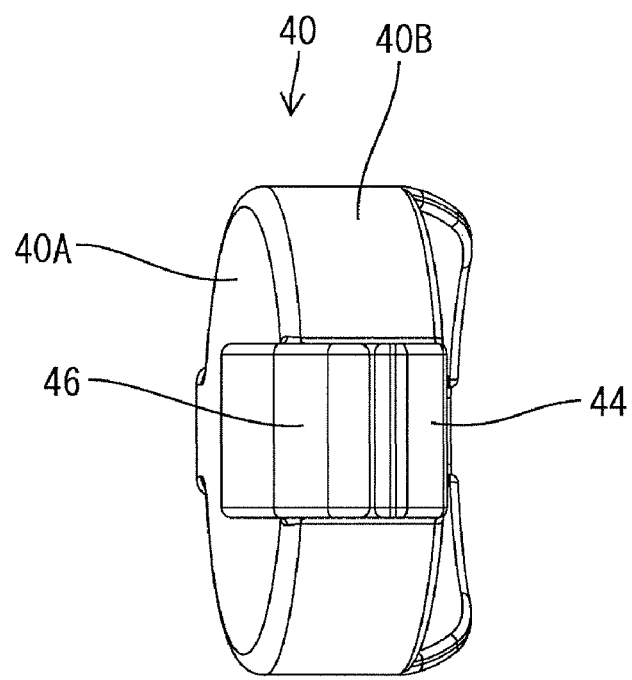
FIG. 17 is a plan view of the protection cap.

As shown in FIG. 17, the locking projection 44 has the same width as the catch 46 and is narrower than the locking projection 34 of the first embodiment in a width direction that is parallel to the leading end of the catch 46.

The catch 46 in this embodiment is an attaching portion to the cable W and as a protecting portion for the lock 14A when the protection cap 40 is mounted on the connecting portion 13.

A third embodiment of the invention is described with reference to FIGS. 22 to 28. This embodiment is achieved by partly changing the construction of the protection cap 30 in the first embodiment while other constructions are the same or similar. Elements that are the same as or similar to the first embodiment are identified by the same reference numerals, but are not described again. Further, parts of the protection cap that are the same as or similar to the protection cap 30 of the first embodiment are identified by reference numerals where the tens digit is changed from 3 to 5.

Figure 22:
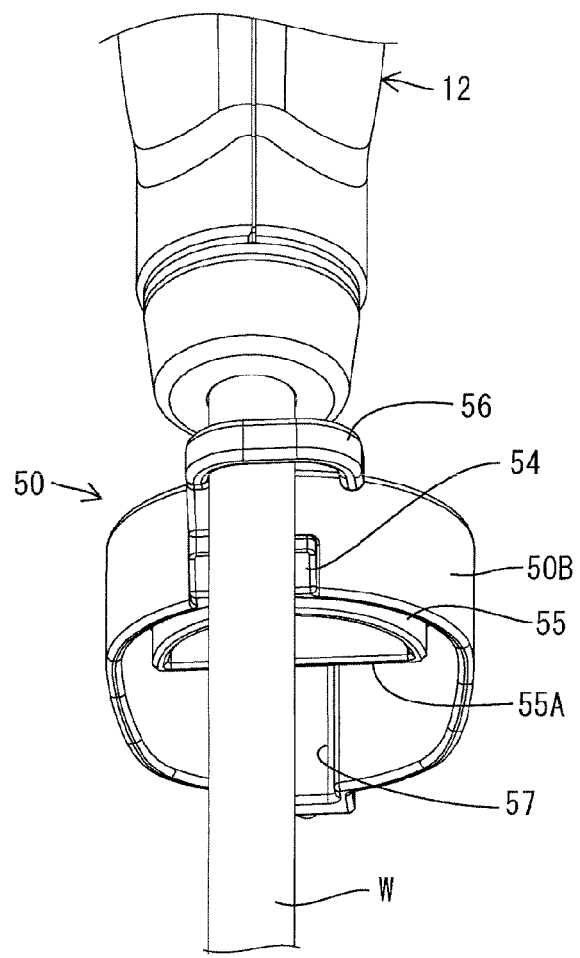
FIG. 22 is a rear view showing a state where a protection cap is attached to a cable in a third embodiment.
Figure 23:
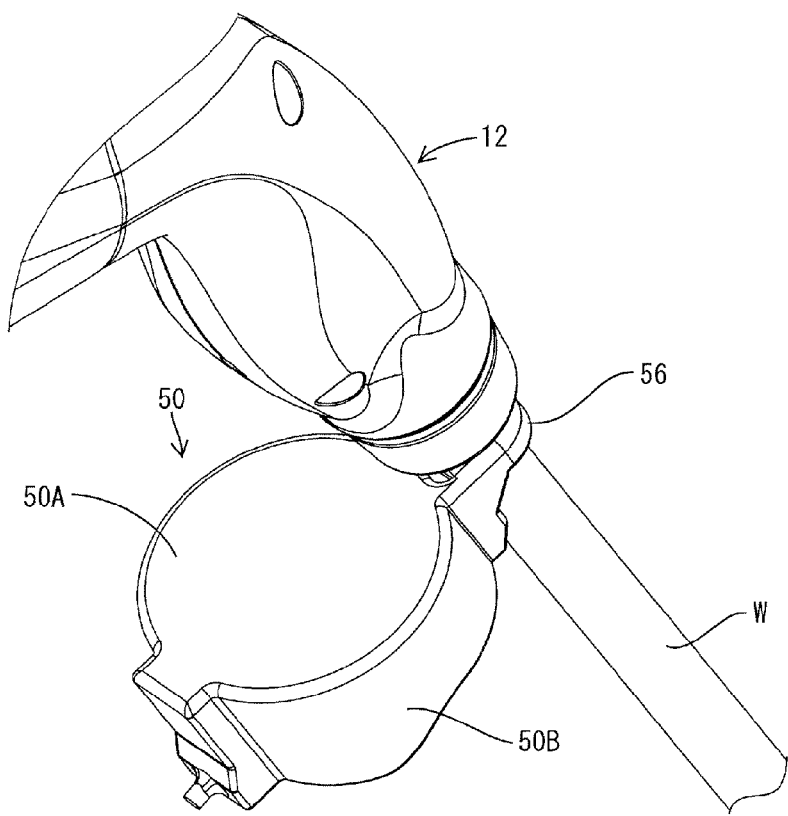
FIG. 23 is a perspective view showing a state where the protection cap is attached to the cable when obliquely viewed from front.
Figure 26:
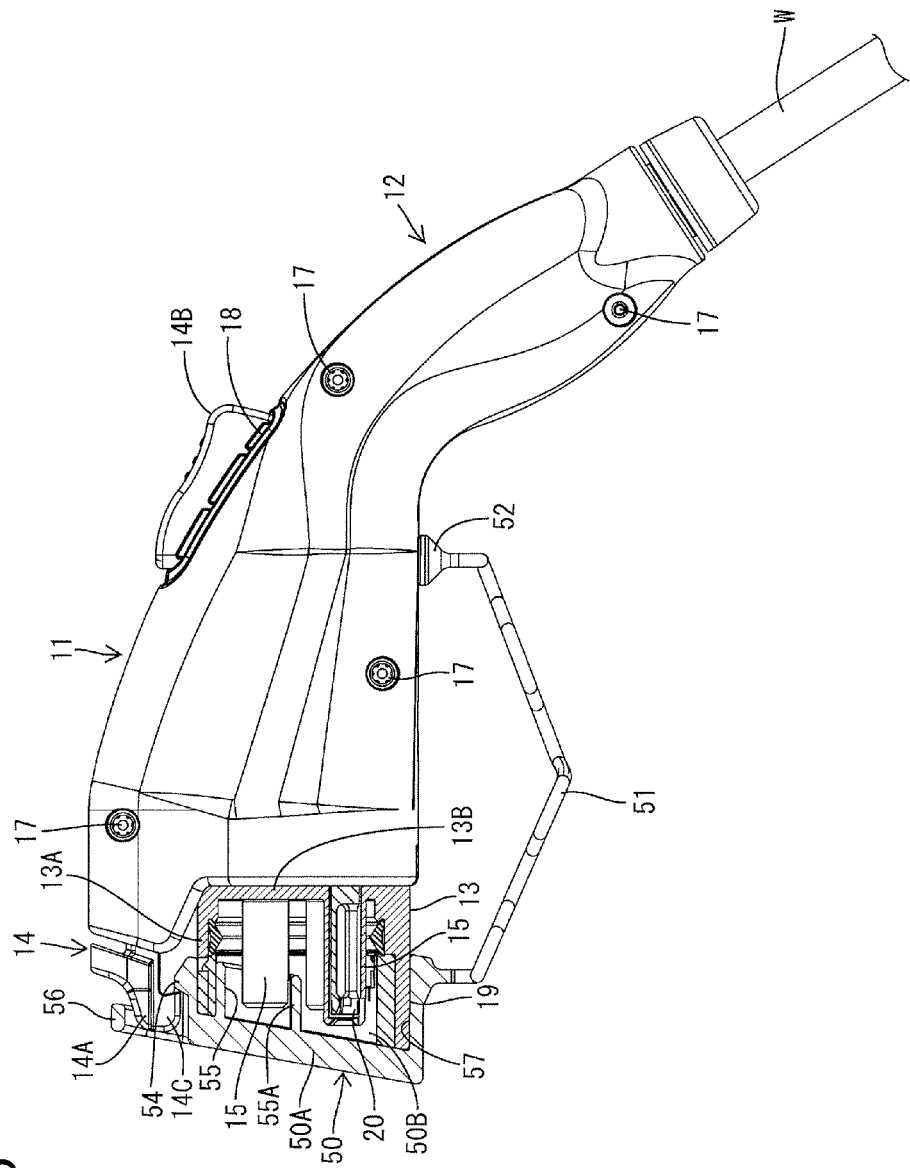
FIG. 26 is a section corresponding to FIG. 3 in the third embodiment.
Figure 27:
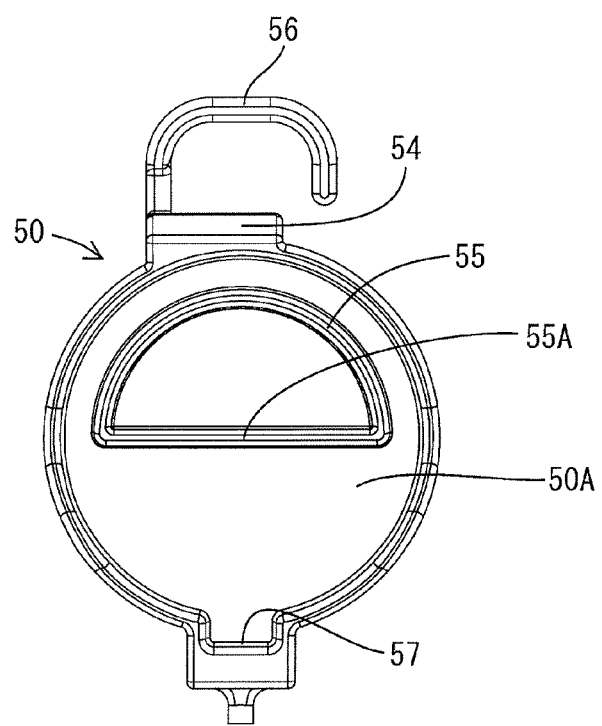
FIG. 27 is a rear view of the protection cap.
Figure 28:
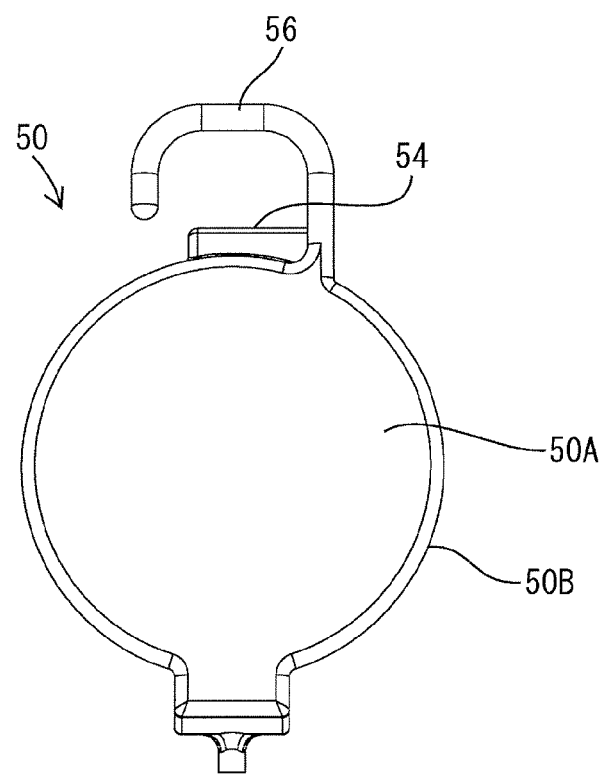
FIG. 28 is a front view of the protection cap.

The protection cap 50 of this embodiment has no mounting grooves 36 in a peripheral wall 50B and, instead, a hook-shaped catch 56 projects from the upper edge of a facing wall 50A as shown in FIGS. 22 and 23. This catch 56 projects from the upper end of the peripheral wall 50B and then extends in a circumferential direction of a peripheral wall 50B. Further, when the protection cap 50 is mounted on the connecting portion 13, the catch 56 at least partly covers the claw 14C of the lock 14A as shown in FIG. 26 to protect the lock 14A from the outside.

Figure 24:
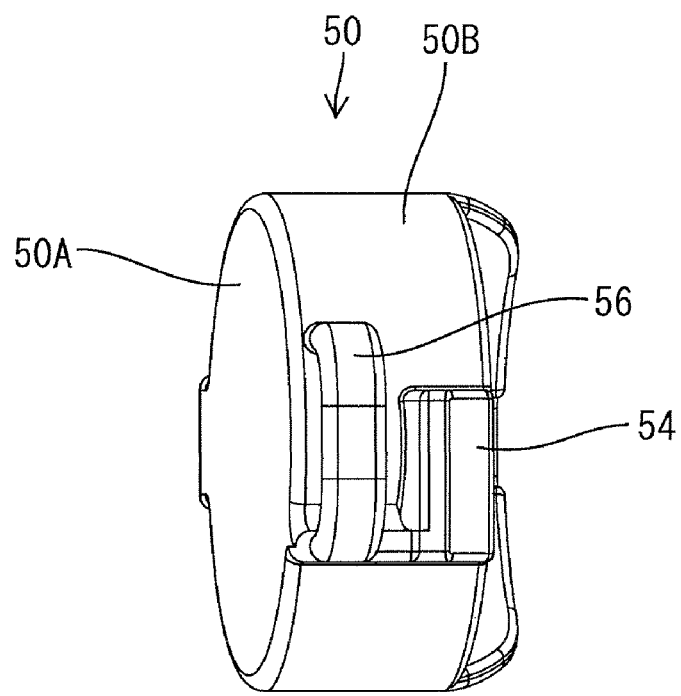
FIG. 24 is a plan view of the protection cap.
Figure 25:
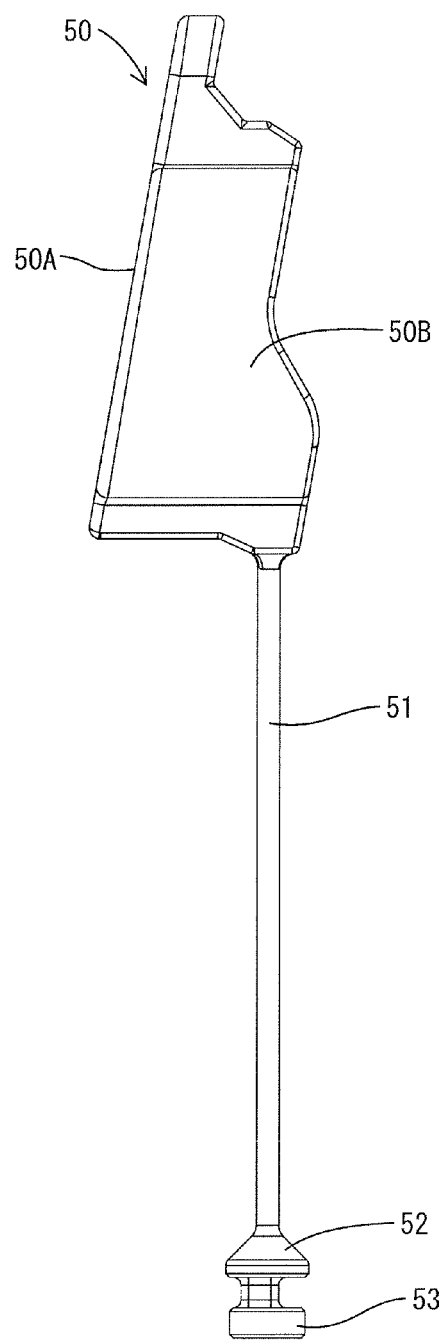
FIG. 25 is a side view of the protection cap.

A distance between the leading end of the catch 56 and the peripheral wall 50B is smaller than the diameter of the cable W. Thus, the catch 56 can be snapped onto the cable W to attach the protection cap 50 to the cable W. The catching portion 56 is set to be about half or less of the diameter (dimension in forward and backward directions) of the peripheral wall 50B and is arranged before the lock 54 so as not to vertically overlap the lock 54, as shown in FIG. 24.

As described above, the catch 56 of this embodiment can be used both as the attaching portion to the cable W and as the protecting portion for the lock 14A, as in the second embodiment. Additionally, the catch 56 can be smaller than the catch 46 of the second embodiment and the protection cap 50 can smaller than the protection cap 40 of the second embodiment.

Figure 29:
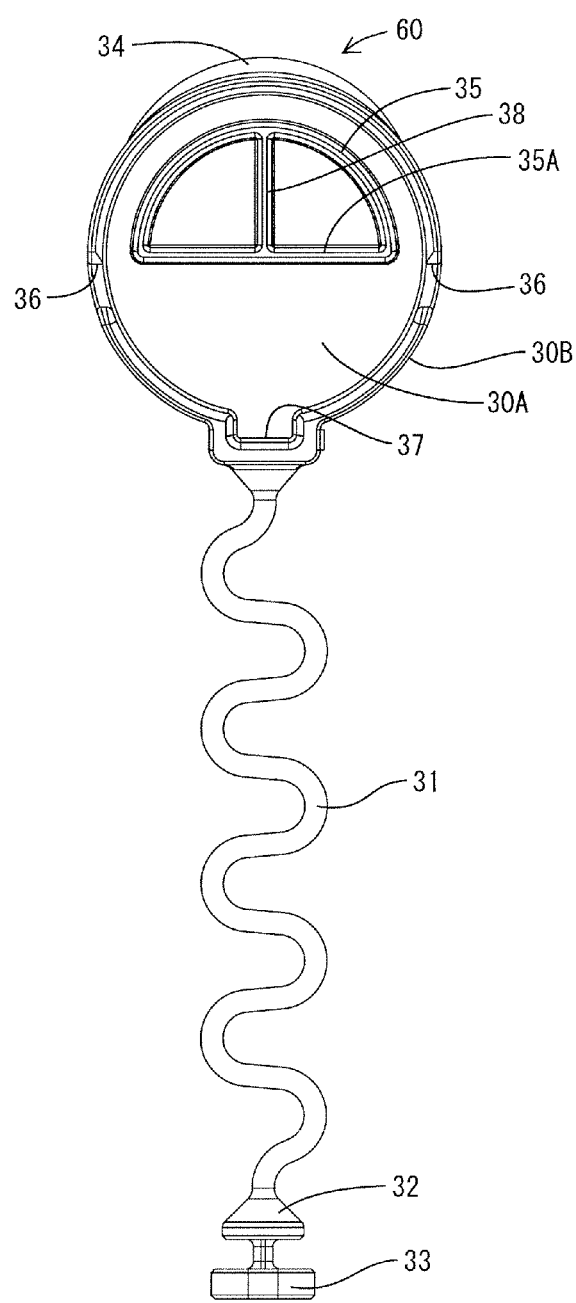
FIG. 29 is a rear view of a protection cap in a fourth embodiment.
Figure 30:
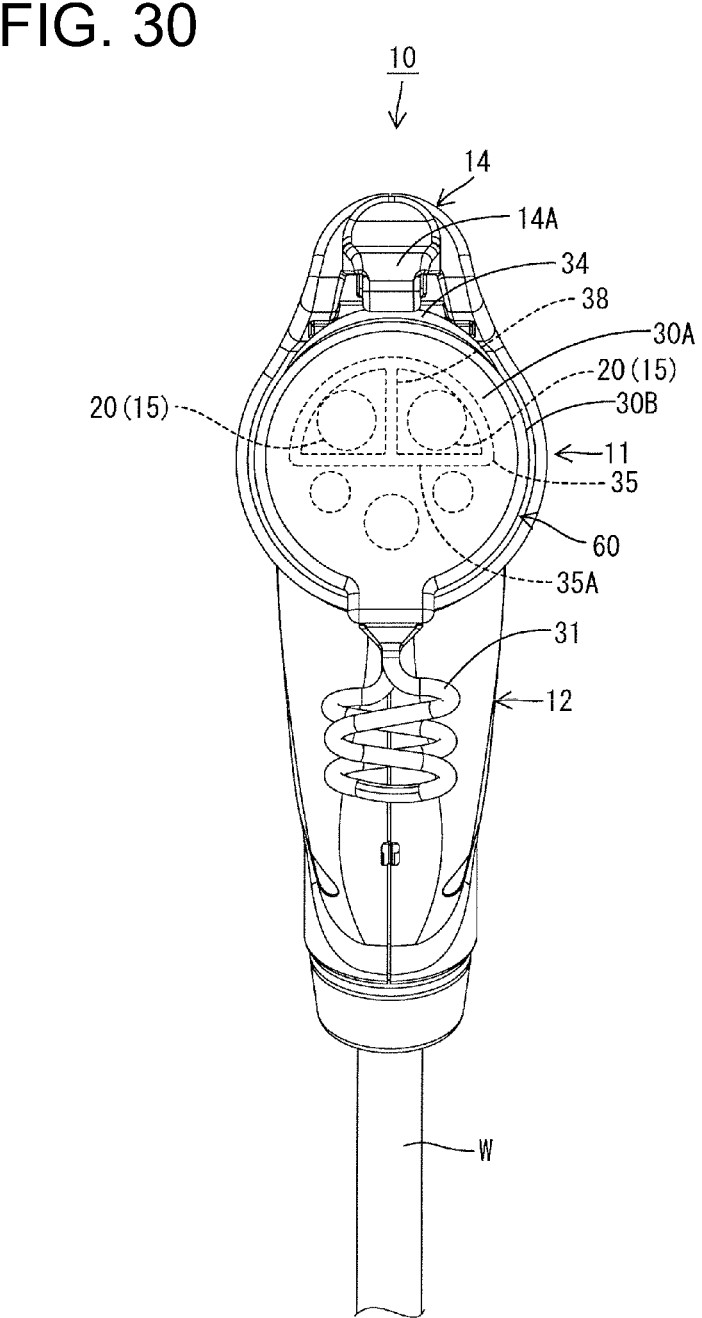
FIG. 30 is a front view showing a state where terminal fittings located in an upper row are electrically insulated by an intermediate wall.

A fourth embodiment of the invention is described with reference to FIGS. 29 and 30. The same or similar constructions as in the first embodiment are identified by the same reference numerals in the following description.

A protection cap 60 of this embodiment is obtained by adding at least one intermediate wall 38 in the separation wall 35 of the protection cap 30 of the first embodiment, and two terminal fittings 20 in a first row are separated while being electrically insulated from each other by the intermediate wall 38. That is, the terminal fittings 20 in the first row are both power supply terminals and can be connected to a household AC power supply. The intermediate wall 38 prevents the production of sparks between the two terminals. Further, the protection cap 60 can be positioned in a rotating direction along the peripheral wall 30B by inserting the intermediate wall 38 between the two terminal fittings 20 in the first row.

The invention is not limited to the above described and illustrated embodiments. For example, the following embodiments also are included in the scope of the invention.

The protection cap is connected to the main body 11 via the rubber string 31 in the above embodiments. However, the protection cap and the main body 11 may be separate members without providing any rubber string according to the invention.

The mounting grooves for tightly holding the cable W and the catch to be hooked onto the cable W are illustrated in the above embodiments. However, the protection cap may be attached to the cable W using a magnet or the like.

The protection cap is made of flexible elastomer in the above embodiments, but a protection cap made of synthetic resin may be used.

The semi-cylindrical separation wall 35 is illustrated in the first to third embodiments. However, a separation wall composed only of a straight part may be provided according to the invention. In this case, the length of the straight part preferably is set so that the opposite ends thereof are arranged near the mounting grooves 36. Further, the separation wall may be so formed that the straight part and the arcuate or bent part are at different heights.

What is claimed is:

1. A charging connector that is to be connected to a vehicle-side connector in a vehicle to provide current for charging a battery in the vehicle, comprising:
    a case body with a connecting portion connectable to the vehicle-side connector;
    a cable drawn out from the case body and being connected to a power supply;
    a protection cap made of an insulating material and being configured for mounting on the connecting portion when the connecting portion is separated from the vehicle-side connector, the protection cap being removable from the connecting portion and being configured for releasable attachment to the cable when connecting the connecting portion to the vehicle-side connector; and
    an elongate flexible connection extending from the protection cap to a location on the case body spaced from the connecting portion and having a length sufficient to enable the protection cap to be mounted on the connecting portion of the case body and to be releasably attached to the cable, wherein
    wherein the protection cap includes a peripheral wall with inner and outer peripheral surfaces, the inner peripheral surface being dimensioned to telescope over the connecting portion of the case body, one end of the elongate flexible connection being connected to the outer peripheral surface of the peripheral wall, and the peripheral wall including at least one mounting groove spaced from the elongate flexible connection and configured for releasably engaging the cable.

2. The charging connector of claim 1, wherein the protection cap includes a facing wall substantially facing the connecting portion in a mounting direction to cover the connecting portion and a peripheral wall extending from the facing wall in the mounting direction and substantially along an outer surface of the connecting portion.

3. The charging connector of claim 2, wherein during a removing operation, parts of the protection cap between peripheral edges of the mounting grooves and the facing wall are deformed resiliently to widen opening parts of the mounting grooves.

4. The charging connector of claim 2, wherein a dimension of a first side of the peripheral wall along the mounting direction is smaller than a dimension of a second side thereof in forward and backward directions.

5. The charging connector of claim 2, further comprising at least one mounting groove in an end edge of the peripheral wall, the mounting groove being formed to surround more than about half of a circumference of the cable.

6. The charging connector of claim 5, wherein:
    the connecting portion includes a power supply terminal for supplying power and at least one separation wall extending from a facing surface of the facing wall substantially in the mounting direction to separate the power supply terminal from another terminal.

7. The charging connector of claim 6, wherein the peripheral wall has two mounting grooves substantially facing each other; and the separation wall extending substantially along the cable mounted between the mounting grooves.

8. The charging connector of claim 7, wherein parts of the mounting grooves in the protection cap are reinforced by the separation wall.

9. The charging connector of claim 7, further comprising a lock for locking the vehicle-side connector and the connecting portion in a connected state.

10. The charging connector of claim 9, wherein the protection cap integrally or unitarily includes a protecting portion for protecting the lock.

11. The charging connector of claim 10, wherein the protecting portion is a hook configured to be hooked onto the cable.

12. The charging connector of claim 10, wherein a distance between a leading end of the protecting portion and a projecting end of a locking projection is smaller than a diameter of the cable.

13. The charging connector of claim 1, wherein two of the terminal fittings are provided as power supply terminals and the cap comprises an intermediate wall configured to be at least partly inserted between the two power supply terminal fittings.

14. The charging connector of claim 13, wherein the protection cap can be positioned in a rotating direction along the peripheral wall by the at least partial insertion of the intermediate wall between the two power supply terminal fittings.

15. The charging connector of claim 1, wherein the elongate flexible connector is a resilient stretchable string.

* * * * *